United States Patent Office 3,835,097
Patented Sept. 10, 1974

3,835,097
LIGHT DEGRADABLE THERMOPLASTIC MOLD-
ING COMPOSITION BASED ON POLYACETALS
Edgar Fischer, Frankfurt am Main, and Karl Friedrich
Muck, Wiesbaden, Germany (both % Farbwerke
Hoechst A.G., Frankfurt am Main, Germany)
No Drawing. Filed Sept. 14, 1972, Ser. No. 289,183
Claims priority, application Germany, Dec. 4, 1971,
P 21 60 223.3
Int. Cl. C08f 1/02
U.S. Cl. 260—67 FP
4 Claims

ABSTRACT OF THE DISCLOSURE

Polyacetals, i.e. homopolymers of formaldehyde or of trioxane or copolymers of trioxane with monofunctionally reacting compounds such as cyclic ethers or cyclic acetals and possibly polyfunctionally reacting compounds can be protected by addition of stabilizers against the action of heat and oxygen. They can, however, be degraded by the action of ultra-violet light if they contain light sensitizers. The polyacetals are suitable for the manufacture of packing material, especially sheets.

---

The present invention relates to a light degradable thermoplastic molding composition based on polyacetals.

It is known that homopolymers of trioxane or of formaldehyde with esterified or etherified terminal groups and copolymers of trioxane and small quantities of a cyclic formal or a cyclic ether can be protected against the action of heat, oxygen and light by adding stabilizers. Suitable heat stabilizers are for example polyamides, amides of polybasic carboxylic acids, amidines, hydrazines, ureas and poly(N-vinyl-lactams). As oxidation stabilizers phenols, especially bisphenols, and aromatic amines are used whilst the derivatives of alpha-hydroxy-benzophenone and of benzotriazole serve as stabilizers against the action of light. The stabilizers are generally used in a total amount of from 0.1 to 10, preferably 0.5 to 5% by weight, calculated on the total mixture.

The products obtained after stabilization are characterized by excellent working properties and durability; the latter property may, however, cause difficult problems in view of the fight against pollution. Therefore, it is desirable to produce poly(oxymethylenes) with the same good working properties we know already, which are, however, less resistant to the action of ultra-violet light, to which they are exposed when deposited in the open air.

It is an object of the present invention to provide a thermoplastic molding composition based on polyacetals which degrades in ultra-violet light and substantially consists of a mixture of from (a) 99.9 to 90% by weight of an oxymethylene polymer and (b) from 0.1 to 10% by weight of a mixture of 10 to 30% by weight of a known heat stabilizer and 90 to 70% by weight of a light sensitizer consisting of naphthoquinone-(1,4), acenaphthene quinone or aceanthrene quinone.

Another object of the invention is a process for the production of a thermoplastic molding composition degradable in ultra-violet light which comprises mixing 99.9 to 90 parts by weight of an oxymethylene polymer with 0.1 to 10 parts by weight of a mixture of 10 to 30 parts by weight of a heat stabilizer and 90 to 70 parts by weight of a light sensitizer, each in powder or granule form, and homogenizing the total mixture at a temperature of from 150° to 250° C.

As oxymethylene polymers there are used either homopolymers of formaldehyde or of trioxane; or copolymers of trioxane and a cyclic ether or a cyclic formal differing from trioxane or a linear polyacetal; or terpolymers of trioxane, a cyclic ether or a cyclic formal differing from trioxane and a polyfunctionally reacting compound.

The portion of homo-, co- or terpolymer of trioxane in the molding composition of the invention is preferably from 99.5 to 95% by weight, whilst the portion of the mixture made up of the heat stabilizer and the light sensitizer is preferably from 0.5 to 5% by weight. Particularly good properties are exhibited by a molding composition which consists of from 99.5% to 98% by weight of a homo-, co- or terpolymer and from 0.5 to 2% by weight of the mixture of the stabilizer and sensitizer.

By homopolymers of formaldehyde or of trioxane we mean those homopolymers of formaldehyde or of trioxane, the terminal hydroxy groups of which are chemically stabilized against degradation for example by esterification or etherification.

When using copolymers preferably cyclic ethers and cyclic formals differing from trioxane of formula I (1) 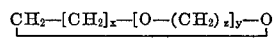

are employed as comonomers. In this formula $x$ is either an integer of from 1 to 3 and $y$ is zero; or $x$ is zero, $y$ is an integer of from 1 to 3 and $z$ is 2; or $x$ is zero, $y$ is 1 and $z$ is an integer of from 3 to 6, preferably 3 or 4.

Suitable cyclic ethers are principally those containing 3 ring members, for example ethylene oxide, styrene oxide, propylene oxide and epichlorohydrin as well as phenylglycidyl ether.

Suitable cyclic formals are principally cyclic formals of aliphatic or cyclo-aliphatic alpha, omega-diols having from 2 to 8, preferably from 2 to 4 carbon atoms, the carbon chain of which may be interrupted by an oxygen atom at intervals of 2 carbon atoms, e.g. glycol formal (1,3-dioxolane), butanediol formal (1,3-dioxepane) and diglycol formal (1,3,6-trioxocane) as well as 4-chloromethyl-1,3-dioxolane and hexanediol formal (1,3-dioxonane).

Equally suitable as oxymethylene polymers are copolymers of trioxane with linear polyacetals. By linear polyacetals we mean both homo- or copolymers of the cyclic acetals as defined above, as well as linear condensates of aliphatic or cyclo-aliphatic alpha, omega-diols with aliphatic aldehydes or thio-aldehydes, preferably formaldehyde. Especially useful are homopolymers of linear formals of aliphatic alpha, omega-diols having from 2 to 8, preferably from 2 to 4 carbon atoms.

Cyclic ethers or cyclic formals differing from trioxane or linear polyacetals are employed as comonomers or co-components preferably in a quantity of from 1 to 5% by weight, calculated on the total quantity of the components to be polymerized.

When using terpolymers the cyclic ethers or cyclic formals differing from trioxane specified above are preferably employed in a quantity of from 0.5 to 2% by weight. Of the polyfunctionally reacting compounds generally a quantity of from 0.01 to 5, preferably 0.05 to 2%, by weight is used. As polyfunctionally reacting compounds are employed mainly alkylglycidyl formals, polyglycoldiglycidyl ether, alkanedioldiglycidyl ether and bis(alkanetriol)triformals are mainly used.

The alkylglycidyl formals may be compounds of formula II (II) 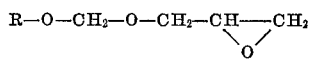

in which R means an aliphatic alkyl radical having 1 to 10, preferably 1 to 5 carbon atoms. Particularly suitable are alkylglycidyl formals of the above formula in which R represents a lower linear aliphatic alkyl radical, e.g. methylglycidyl formal ethylglycidyl formal, propylglycidyl formal and butylglycidyl formal.

As polyglycoldiglycidyl ethers compounds of formula III (III) 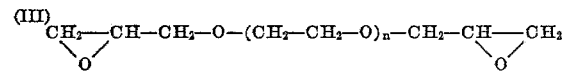

are useful in which $n$ represents an integer of from 2 to 5. Particularly suitable are polyglycoldiglycidyl ethers of the above formula, wherein $n$ is 2 or 3, for example diethyleneglycol-diglycidyl ether and tri-ethyleneglycol-diglycidyl ether.

As alkanedioldiglycidyl ethers compounds of formula IV (IV) 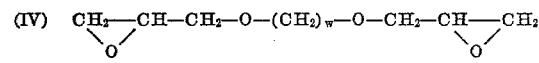

are useful wherein $w$ is an integer of from 2 to 6, preferably 2 to 4. Especially suitable is butanedioldiglycidyl ether.

The bis(alkanetriol)-triformals may be compounds with one linear and two cyclic formal groups, especially compounds of formula V (V) 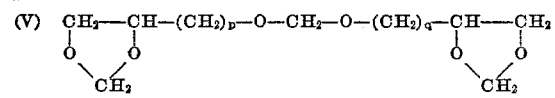

wherein $p$ and $q$ represent each an integer of from 3 to 9, preferably 3 or 4. Particularly suitable are symmetrical bis(alkanetriol) triformals of the above formula, in which $p$ and $q$ represent the same number, for example bis(1,2,5-pentanetriol) triformal and preferably bis(1,2,6-hexanetriol) triformal.

The homopolymers of formaldehyde or of trioxane used for the molding composition of the present invention are obtained, in known manner, by catalytic polymerization of the monomer (cf. for example German Auslegeschrift 1,037,705 and German Pat. 1,137,215). The copolymers or terpolymers of trioxane used for the molding composition of the invention are equally obtained, in known manner, by polymerizing the monomers in the presence of cationic catalysts at temperatures between 0 and 100° C., preferably 50 and 90° C. (cf. for example German Auslegeschrift 1,420,283). As catalysts for this purpose are used protonic acids, e.g. perchloric acid, or Lewis acids, for example boron trifluoride as well as its complex compounds and salt-like compounds, for example boron trifluoride etherates and trialkyloxoniumtetrafluoro borates. The polymerization can take place in bulk suspension or solution. For the removal of unstable portions it is best to subject the copolymers to a partial controlled thermal or hydrolytic degradation to the primary terminal alcohol groups (cf. for example German Auslegeschriften 1,445,273 and 1,445,294).

The usual heat stabilizers comprise principally polyamides, amides of polybasic carboxylic acids, amidines, for example dicyanodiamide, hydrazines, ureas, poly(N-vinyl-lactams) and particularly alkaline earth metal salts of saturated or unsaturated carboxylic acids with 10 to 20, preferably 12 to 18, carbon atoms, for example the calcium salts of lauric, stearic or ricinoleic acid.

As light sensitizers for this invention certain polynuclear alicyclic compounds with quinonoid structure are used, i.e. naphthoquinone-(1,4), acenaphthene quinone and aceanthrene quinone; these light sensitizers are either used separately or in admixture with one another.

By adding the light sensitizers used in accordance with the invention to oxymethylene polymers one obtains a molding composition with a considerable tendency towards degradation in ultra-violet light without negatively influencing the physical properties and the working properties of the product. The values of thermostability and the melt indices are exactly the same as in the case of a polyacetal stabilized as usual without light sensitizers.

For the production of the molding composition of the invention the components are mixed thoroughly with one another, in powder or granule form at a temperature of below 100° C., preferably between 15 and 50° C., and the mixture is subsequently homogenized in the melt. The homogenizing may take place in any mixing device for example in roll mills, calenders, kneaders or extruders, at a temperature above the crystallite melting point of the components, i.e. at a temperature of from 150 to 250° C., preferably from 170° to 200° C. After the homogenizing the mixture is comminuted, for example granulated, rasped or pulverized, when it is still hot or already cooled down i.e. still in the plastic or already in the solid state. Preferably the plastic mass is granulated at a temperature of from 170° to 250° C., or it is cooled down by means of an air or water bath and is then granulated.

On the one hand, the molding composition of the invention can easily be processed, but permits, on the other hand, the manufacture of shaped articles with a reduced durability when exposed to ultra-violet light. The molding composition is particularly suitable for the manufacture of packing material, for example sheets, bags and sacks.

EXAMPLES

Polymer powder, stabilizer and sensitizer were thoroughly mixed at room temperature and homogenized in a single screw extruder at 200° C.

For measuring the degradation in ultra-violet light sheets of a thickness of 100 microns were put on an aluminium foil and their brittle time was determined in a weathering apparatus (system Casella) of Messrs. Heraeus (Hanau). (See catalogue of Messrs. Quarzlampen Gesellschaft mbH (Hanau)).

In order to judge the working properties the reduced specific viscosity (RSV), the thermostability $\Delta G$ and the melt index $i_2$ were determined in comparison to the products stabilized as usual (Comparative examples A to E). During these tests also those sensitizers were examined which had already been known (Comparative Examples F and G).

The values of the reduced specific viscosity of the polymers were measured in solutions of the polymers in butyrolactone containing 2% by weight of diphenylamine at a temperature of 140° C. and in a concentration of 0.5 g./100 ml. The melt index $i_2$ was measured in accordance with DIN 53 735 at a temperature of 190° C. and at a load of 2.16 kg. The thermostability was measured by determination of the loss of weight occurring in air at a temperature of 230° C. in the course of 2 hours.

TABLE 1
(Comparative examples)

| Number | Polymer (composition in percent by weight) | Stabilizer (composition in percent by weight) [1] | Sensitizer (quantity in percent by weight) | Melt index (g./10 min.) | RSV (dl./g.) | Weight loss (percent) | Brittle time (hours) |
|---|---|---|---|---|---|---|---|
| A | Trioxane (98), ethylene oxide (2) | DCD (1), MBP (5) | | 9.5 | 0.79 | 2.5 | 400 |
| B | do | CaR (1), BDE (5) | | 9.2 | 0.75 | 2.3 | 440 |
| C | Polyformaldehyde | CaR (1), BDE (5) | | 10.1 | 0.80 | 4.3 | 380 |
| D | Trioxane (97), dioxolane (3) | CaR (1), BDE (5) | | 9.8 | 0.72 | 2.7 | 410 |
| E | Trioxane (97, 95), ethylene oxide (2), butanedioldiglycidyl ether (0.05). | CaR (1), BDE (5) | | 7.4 | | 1.9 | 400 |
| F | Trioxane (97), dioxolane (3) | CaR | Benzophenone (0.5) | 20.2 | 0.3 | 41.0 | 140 |
| G | do | CaR | Fluorenone (0.5) | 15.3 | 0.4 | 28.6 | 100 |
| H | do | CaR | | 12.3 | 0.8 | 35.0 | 311 |

[1] The stabilizer, respectively the stabilizer combination, was always used in a quantity of 0.1% by weight.

TABLE 2
(Examples in accordance with the invention)

| Number | Polymer (composition in percent by weight) | Stabilizer (composition in percent by weight) | Sensitizer (quantity in percent by weight) | Melt index (g./10 min.) | RSV (dl./g.) | Weight loss (percent) | Brittle time (hours) |
|---|---|---|---|---|---|---|---|
| 1 | Trioxane (98), ethylene oxide (2) | DCD | Aceanthrene quinone (0.5) | 10.2 | | 2.3 | 84 |
| 2 | do | DCD | Acenaphthene quinone (0.5) | 9.9 | | 3.7 | 89 |
| 3 | do | DCD | Naphthoquinone (0.5) | 9.6 | | 3.5 | 45 |
| 4 | do | DCD | Acenaphthene quinone (0.25), aceanthrene quinone (0.25). | 9.6 | | 2.3 | 89 |
| 5 | do | DCD | Aceanthrene quinone (0.25), anthron (0.25). | 9.9 | | 3.0 | 75 |

The abbreviations used in the tables have the following meaning:

DCD: dicyanodiamide
MBP: 2,2'-methylene-bis(4-methyl-6-tert.butylphenol)
CaR: calcium ricinoleate
BDE: β,β'-bis(4-hydroxy-3,5-di - tert.butylphenyl) - dipropionic acid-hexanediol-(1,6)ester

What is claimed is:

1. A thermoplastic molding composition based on polyacetals, substantially consisting of a mixture of (a) 99.9 to 90% by weight of an oxymethylene polymer and (b) 0.1 to 10% by weight of a mixture of 10 to 30% by weight of a heat stabilizer selected from polyamides, amides of a polybasic carboxylic acid, amidines, hydrazines, ureas, poly(N-vinyllactams), alkaline earth metal salts of carboxylic acids and mixtures thereof, and 90 to 70% by weight of a light sensitizer selected from naphthoquinone-(1,4), acenaphthene quinone, aceanthrene quinone and mixtures thereof.

2. The molding composition in accordance with claim 1 wherein the oxymethylene polymer is a copolymer of trioxane and a compound of formula I (I) 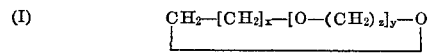

in which $x$ represents either an integer of from 1 to 3 and $y$ is zero, or in which $x$ is zero, $y$ is an integer of from 1 to 3 and $z$ is 2, or in which $x$ is zero, $y$ is 1 and $z$ is an integer of from 3 to 6.

3. A process for the production of a thermoplastic molding composition degradable in ultra-violet light, wherein 99.9 to 90 parts by weight of an oxymethylene polymer are mixed with 0.1 to 10 parts by weight of a mixture of from 10 to 30 parts by weight of a heat stabilizer selected from polyamides, amides of a polybasic carboxylic acid, amidines, hydrazines, ureas, poly(N-vinyllactams), alkaline earth metal salts of carboxylic acids and mixtures thereof, and from 90 to 70 parts by weight of a light sensitizer selected from naphthoquinone-(1,4), acenaphthene quinone, aceanthrene quinone and mixtures thereof, each in powder or granule form, and the mixture is subsequently homogenized at a temperature of from 150° C. to 250° C.

4. The process in accordance with claim 3 which comprises using as oxymethylene polymer a copolymer of trioxane and a compound of formula I (I) 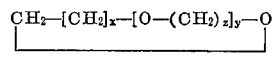

in which $x$ represents either an integer of from 1 to 3 and $y$ is zero, or in which $x$ is zero, $y$ is an integer of from 1 to 3 and $z$ is 2, or in which $x$ is zero, $y$ is 1 and $z$ is an integer of from 3 to 6.

References Cited

UNITED STATES PATENTS 3,385,832  5/1968  Jennings et al. ____ 260—45.9 P

MELVYN I. MARQUIS, Primary Examiner

U.S. Cl. X.R.

260—45.85 R, 45.9 P, Dig. 43

UNITED STATES PATENT OFFICE
CERTIFICATE OF CORRECTION

Patent No. 3,835,097    Dated September 10, 1974

Inventor(s) Fischer et al.

It is certified that error appears in the above-identified patent and that said Letters Patent are hereby corrected as shown below:

In the Heading: Line 3, after the title, after "Germany)" insert -- assignors to Farbwerke Hoechst Aktiengesellschaft vormals Meister Lucius & Bruning, Frankfurt/Main, Germany --.

Signed and sealed this 4th day of March 1975.

(SEAL)
Attest:

RUTH C. MASON
Attesting Officer

C. MARSHALL DANN
Commissioner of Patents
and Trademarks